(12) United States Patent
Cheng

(10) Patent No.: US 7,031,726 B2
(45) Date of Patent: Apr. 18, 2006

(54) METHOD AND APPARATUS FOR DETECTING RECEIVED RADIATION POWER

(75) Inventor: Steven D. Cheng, San Diego, CA (US)

(73) Assignee: Benq Corporation, Taoyuan (TW)

( * ) Notice: Subject to any disclaimer, the term of this patent is extended or adjusted under 35 U.S.C. 154(b) by 216 days.

(21) Appl. No.: 10/811,185

(22) Filed: Mar. 26, 2004

(65) Prior Publication Data

US 2005/0215268 A1    Sep. 29, 2005

(51) Int. Cl.
*H04Q 7/20*    (2006.01)
(52) U.S. Cl. ............... 455/456.1; 455/524; 455/67.11
(58) Field of Classification Search .. 455/456.1–456.6, 455/522, 67.11, 115.1, 115.3, 436–441, 524, 455/525, 404.2; 342/357.08, 357.1
See application file for complete search history.

(56) References Cited

U.S. PATENT DOCUMENTS

| | | | |
|---|---|---|---|
| 5,491,837 A * | 2/1996 | Haartsen | 455/62 |
| 6,119,005 A * | 9/2000 | Smolik | 455/436 |
| 6,477,380 B1 * | 11/2002 | Uehara et al. | 455/456.1 |
| 2003/0008669 A1 * | 1/2003 | Stein et al. | 455/456 |
| 2004/0152471 A1 * | 8/2004 | MacDonald et al. | 455/456.1 |
| 2005/0170834 A1 * | 8/2005 | Dutta et al. | 455/436 |

* cited by examiner

*Primary Examiner*—Erika A. Gary
*Assistant Examiner*—Shantell Portis
(74) *Attorney, Agent, or Firm*—Thomas, Kayden, Horstemeyer & Risley

(57) ABSTRACT

A radiation detection method and apparatus thereof for estimating radiation power received by the mobile station. The locations of nearby base stations and the mobile station are obtained from the broadcast system messages and the location service provided by the service provider, and based on the location information, the radiation power is estimated according to the distances between the base stations and the mobile station. In addition, the radiation estimation process also utilizes the radiation power of monitored base stations constantly measured by the mobile station for cell selection to determine the effects of interference. Based on a preset safety value and the estimated radiation power, the radiation detection device of the present invention automatically issues an alert when entering a high radiation environment.

18 Claims, 6 Drawing Sheets

METHOD AND APPARATUS FOR DETECTING RECEIVED RADIATION POWER

BACKGROUND OF THE INVENTION

1. Field of the Invention

The present invention relates to a method and apparatus for detecting radiation power, and more specifically, to a method and apparatus for monitoring the surrounding radiation power generated from base stations.

2. Description of the Related Art

Many studies and articles related to cellular radiation suggest that there is a potential for high-speed wireless data networks to cause illnesses in humans from headaches to brain cancer. The Wideband Code Division Multiple Access (WCDMA) system promise to become one of the most popular wireless communication systems in the Third Generation (3G) of communication systems as WCDMA supports a large data throughput for multimedia services. Base stations of the WCDMA system however, emit much greater radiation power than base stations of the traditional Code Division Multiple Access (CDMA) system and the Global System for Mobile Communications (GSM). The WCDMA system is capable of carrying a large volume of data in the wideband radio waves as the frequency bands are not reused. In contrast, strong radiation emission is not a by-product of the traditional GSM base stations as they are restricted by a frequency reuse limitation. The significant growth in number of mobile users and user density in the last decade has resulted in a proportional increases in the radiation power density.

Received Radio Signal Strength Indicator (RRSI) data is not constant at an observation point, instead it varies from time to time due to interference effects, such as changes in weather, obstructions, refraction, or reflection due to the terrain or buildings. Some types of interference dissipate rapidly, while others may last for hours, or by permanent. In other words, the radiation power of a certain location fluctuates the type of interference, hence received radiation power is sometimes much higher than average.

FIG. 1 is a diagram illustrating the RSSI data (RSSI value can be used to estimate the received radiation power) distribution chart targeted at Spirit base station 975, with receiver site located at BenQ WTC lab. The vertical axis (Y axis) represents frequency (count) of power measurement, and the horizontal axis (X axis) indicates strength of the radiation power in dBm. As shown in FIG. 1, all the absolute RSSI values range from 58.2 dBm to 84.6 dBm, that is, the received RSSI values range from −58.2 dBm to −84.6 dBm. The mean value of the total RSSI signals is around −67 dBm, but a small percentage of the RSSI signals is above −60 dBm. This radiation power strength of −60 dBm is at least seven times larger than the average RSSI signal. FIG. 1 illustrates the measured radiation power at twice above the average radiation power (−64 dBm) for significant amount of time.

According to many radiation studies, human exposure to high radiation power is extremely harmful, and although the wireless network service providers regulate the radiation emitted by each of their base stations, there is no guarantee that the aggregate radiation power emitted by all base stations in a given area will be under the claimed harmless level. Each wireless network service provider focuses only on its individual network planning without regard to the aggregate radiation power level. Each base station located near an observed point contributes a certain percentage of radiation power to the observed point. The proportion of radiation power contributed by each base station also varies, for example, the radiation power of wideband communication systems is greater than narrowband communication systems as mentioned previously, and base stations covering a larger area than the so called pico-cell base stations which cover a small area also emit larger radiation power. In areas with high population density, service providers deploy more base stations than in areas with less population to support demand, hence the average radiation power of a densely populated area is greater. Additionally, the fluctuation of radiation power due to interference at an observed point, and received radiation power vary greatly at different observation points.

Furthermore, there may be other radiation power generated by wireless communication networks in the same area, for example, wireless services provided through the wireless Local Area Network (LAN), blue-tooth, Ultra-Wide-Band, cordless phones, and other short distance wireless protocols. Each short distance wireless communication system transmitter contributes to the total radiation power in a given area. The FCC however only regulates the output power of each type of base station, not the total number of base stations deployed in the same area, or the total radiation power emitted in the same area.

As a result, the radiation level at certain observed points will be much higher than at other observed points, and the radiation level thereof may be even higher at particular times of day. The likelihood of human exposure high-radiation is greater when entering these areas. Therefore it is desirable to warn an individual when entering an area with high or excessive radiation power. In order to derive the total radiation power effect existing in a given location, all the radiation signals in the entire spectrum must be measured. A spectrum analyzer can be used to achieve signal measurement; however, it is impractical to carry spectrum analyzer to continuously detect surrounding radiation levels.

SUMMARY OF THE INVENTION

Accordingly, the object of the present invention is to issue an alert when the surrounding radiation exceeds a predetermined safe level. A radiation detection apparatus continuously measures the surrounding radiation power and immediately issues an alert when the measured value exceeds the preset safety. The radiation detection apparatus of the invention can potentially limit exposure by alerting a user when entering an area with high radiation generated by wireless base stations.

The radiation detection apparatus proposed in the present invention is implemented in a mobile station capable of wireless voice and/or data communication, for example, a cellular phone or personal digital assistant (PDA). The radiation detection method of the present invention utilizes data accessible by the mobile station to derive the total radiation power. The data includes cellular information such as Mobile Country Code (MCC), Mobile Network Code (MNC), and Location Area code (LAC), the RSSI values of the serving cell and its neighbor cells measured for cell selection and reselection, and the current mobile station location acquired by the location service feature embedded in many of the 3G mobile stations. Implementation of the current invention in mobile stations is advantageous as it eliminates the need for an additional radiation detection device.

The present invention provides a method for a mobile station which detects and estimates radiation power received thereby. The mobile station derives a current location using a location service feature embedded therein such as the Assisted Global Positioning System (AGPS). The mobile station then generates a base station combination and corresponding base station information according to the serving base station. The base station combination and the corresponding base station information are retrieved by searching database using location information as the search index. The location information comprises MCC, MNC, and LAC are broadcast by the mobile station throughout the cellular system for determining cell selection and reselection algorithms. The database stores a set of base station information for each base station, and each set of base station information comprises MCC, MNC, LAC, base station identification number (ID), power level, longitude, latitude, altitude, and other information related to the corresponding base station. This database can be built offline before being activated, and the contents thereof can be downloaded into a portable secondary memory device or accessed through the wireless packet data protocol.

After obtaining the base station information corresponding to the base stations that match the location information, the distance between the mobile station and each base station in the base station combination is calculated. A total radiation power is then estimated by substituting the calculated distances into a predetermined equation, wherein the predetermined equation states the relationship between the total radiation power and the calculated distances. The radiation power is modeled by the inverse proportion to the square of the distance between the transmitter and the receiver. The total radiation power received by the mobile station is the sum of the radiation power corresponding to each nearby base station. If the estimated total radiation power is greater than a preset minimal safety value, an alert is issued indicating a potentially hazardous radiation level.

If the change in location does alter the base station combination, the total radiation power is simply updated by acquiring a new mobile station location and recalculating the total radiation power according to the new distances. If the change in location alters the base station combination, a new base station combination must then be derived by searching the database using the new location information. The change in location indicates that the mobile station has entered a new cell with a different MCC, MNC, and LAC value.

The present invention is applicable when a mobile station enters an area covered by several LACs (or cells). When the mobile station is located in an area covered by several LACs, adjacent LACs are derived using the LAC obtained through broadcast system messages, and the location information is updated to include all the adjacent LACs. The base station combination therefore comprises more base stations since more LACs are contributing to the radiation level. Some base stations in the base station combination may however be too far distance to contribute the radiation power, thus these base stations are assumed to have no effect on the total radiation power. In order to simplify the calculation, the calculated distance corresponding to each base station is thus compared with a predetermined distance, and the base stations with a distance greater than the predetermined distance are excluded from the base station combination.

The protocol stack inside the mobile station constantly measures the radiation power of the serving cell and its neighbor cells for cell selection and reselection. The measured radiation values can be used to replace the estimated values of the corresponding base stations in order to incorporate the instantaneous interference effect in the radiation estimation process of the present invention. The mobile station first derives a list of monitored base stations including the serving cell, and then measures and calculates the total radiation power of the monitored base stations. The monitored base stations must be excluded from the base station combination to ensure that the estimated radiation power does not include the radiation power emitted from these monitored base stations. The measured radiation power and the estimated radiation power are added together as the total radiation power.

Some interference effects appear for only a very short period of time, frequent alarms if the radiation detection apparatus is too sensitive to fast fading interference. Accordingly, the present invention also provides a method for adjusting the sensitivity of the radiation power detection method by utilizing a rotational counter to record consecutive occurrences of total radiation power greater than the preset minimal safety value, informing the mobile user only if the number of occurrences is greater or equal to a tolerance index. The tolerance index is set by the mobile user, and a higher tolerance index indicates a lower sensitivity to interference.

The radiation detection apparatus proposed in the present invention performs the radiation detection method described above. The radiation detection apparatus implemented in the mobile station triggers an alert indicating that the total surrounding radiation power exceeds the allowable safety value.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 2:
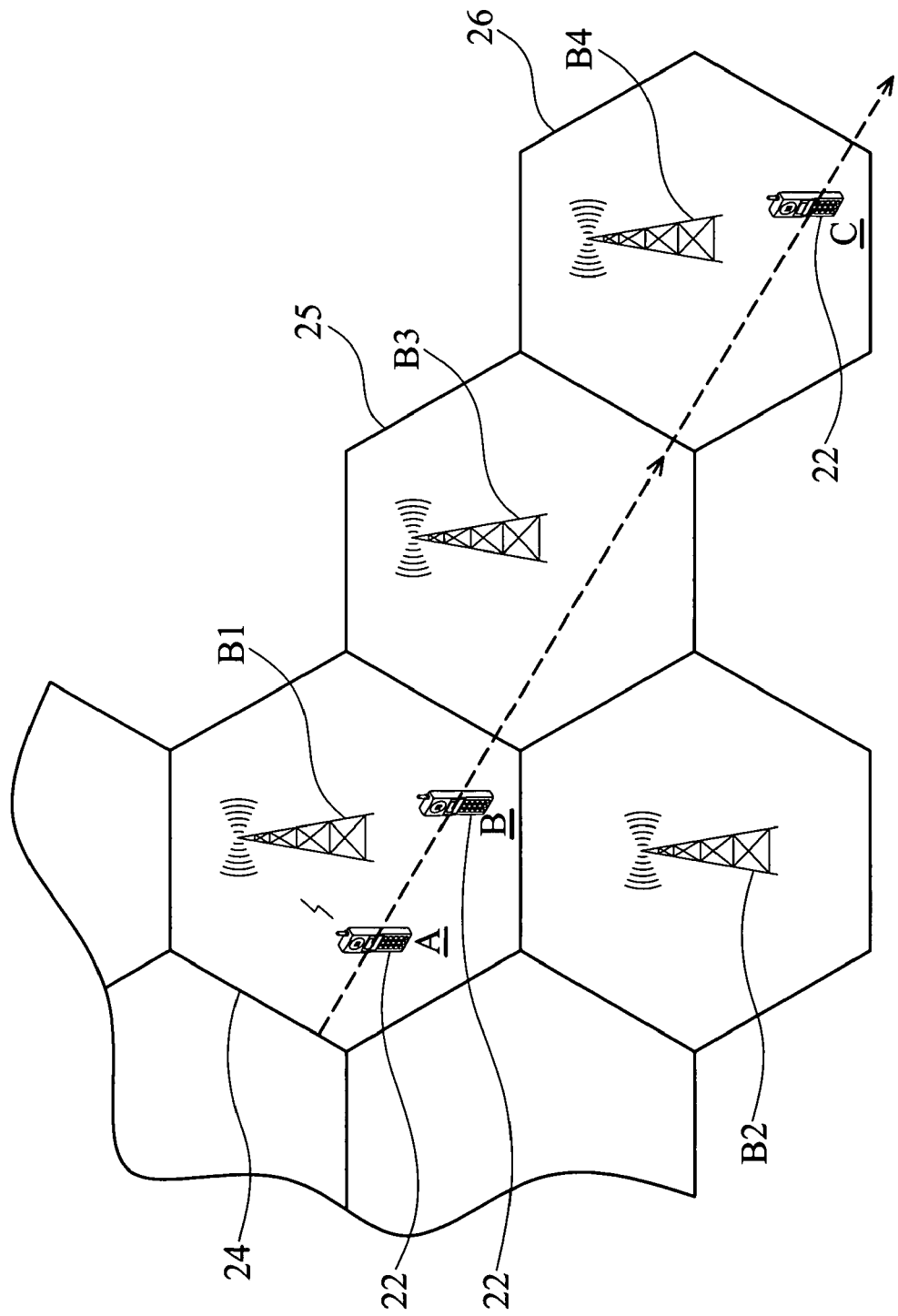
FIG. 2 is a diagram showing a mobile station as its position changes in a wireless communication system.
Figure 3:
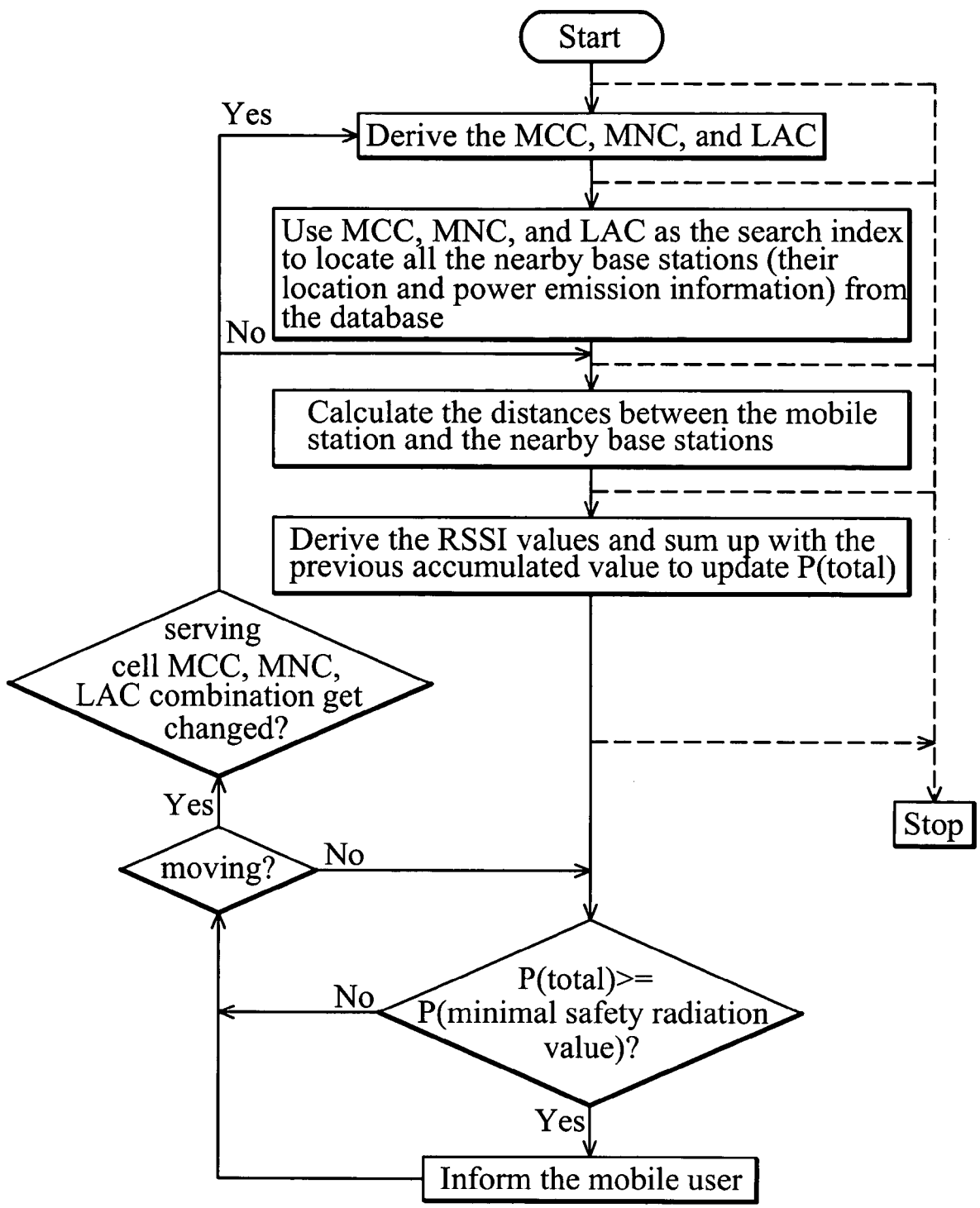
FIG. 3 is a flowchart illustrating the radiation power estimation method according to the first embodiment of the present invention.

FIG. 2 is a diagram illustrating an example of a mobile user carrying a mobile station 22 moving from cell 24 to cell 26 in a wireless communication service. The mobile station 22 is initially at location A, connected to a base station B1. It is assumed that the mobile station 22 comprises the radiation detection apparatus of the present invention. The radiation detection and estimation method of the first embodiment is described in the following.

The mobile station 22 in FIG. 2 automatically derives the Mobile Country Code (MCC), Mobile Network Code (MNC), and Location Area Code (LAC) in an area that support the same communication protocol and radio frequency (RF) band. The MCC, MNC, LAC are part of the cell information broadcast to each mobile station in the service area, and the mobile stations use the cell information for location registration. The cell selection and reselection algorithm used by the wireless communication protocol is capable of detecting the mobile station location and identifying a nearby base station. As shown in FIG. 2, the mobile station 22 at position A is located in the service area of base station B1 (cell 24), so the mobile station 22 will receive the MCC, MNC, and LAC related to the base station B1.

A database in the mobile station 22 stores a set of records with MCC, MNC, LAC, base station ID, power level, longitude, latitude, altitude, and others, and built offline before being activated. The contents of the database can additionally be downloaded into a portable secondary memory device or accessed through the wireless packet data protocol. When the mobile station 22 obtains the MCC, MNC, and LAC, it uses these values as the search index to locate all the nearby base stations and return the corresponding location and power emission information from the database. For example, the database returns N records with the same MCC, MNC, and LAC values, and each of these returned records from the database search represents a base station and its power, location, and other information. The base stations corresponding to the returned records are referred to as the base station combination, and these base stations are considered as the nearest base stations with respect to the mobile station, thus emitting the greatest radiation power.

After acquiring the base station combination from the database, the next step is to obtain the current location of the mobile station 22 L{m}, in order to calculate the distances between the mobile station 22 and each base station included in the base station combination. The location information, longitude, latitude, and altitude, L{x(B(i)), y(B(i)), z(B(i))} of a base station B(i) is obtained from the database, and the location of the mobile station 22 L{x(m), y(m), z(m)} can be derived by the location service feature embedded in the mobile station 22. The distance between the mobile station 22 and the base station B(i) is thus $\{[x(m)-x(B(i))]^2+[y(m)-y(B(i))]^2+[z(m)-z(B(i))]^2\}^{1/2}$. Most Third Generation (3G) communication systems provide location services, and one of the most popular location services is the Global Positioning System (GPS). Some location service systems, for example the Assisted Global Positioning System (AGPS) are capable of precise location with maximum deviation of only 5 meters from the actual target.

Once the distances between the mobile station 22 and the base stations of the base station combination are calculated, the total radiation power is then estimated and calculated. The received signal strength is inversely proportional to the square of the distance, as the further the distance, the weaker the signal strength. The radiation power is estimated using the received signal strength. The following equation represents the radiation power from the base station B1 received at a point with a distance D away from the base station B1.

$$P=C(B1)*(1/D^2)$$

C(B1) is a constant value for the base station B1, and this value is derived from the power level of the base station B1. By substituting the distance derived previously, the radiation power emitted from the base station B1 is:

$$P=C(B1)*\{1/\{[x(m)-x(B1)]^2+[y(m)-y(B1)]^2+[z(m)-z(B1)]^2\}\}$$

If there are N base stations in the base station combination, the total radiation power P(total) is therefore:

$$P(\text{total}) = \sum_{i=1}^{N} C(B(i))\left\{\frac{1}{[x(m)-x(B(i))]^2+[y(m)-y(B(i))]^2+[z(m)-z(B(i))]^2}\right\}$$

wherein the current location of the mobile station m and the base station B(i) are denoted by L(m)={x(m), y(m), z(m)} and L(B(i))={x(B(i)), y(B(i)), z(B(i))} respectively.

The total radiation power P(total) is compared to a minimal safety radiation value, and if P(total) is greater, indicating a radiation hazard currently exists at this location L{x(m), y(m), z(m)}. The mobile station 22 will thus send an alert message.

If the location change is within the same scope and contains the same combination of base stations, the new location of the mobile station is the only information required for update. For example, when the mobile station moves from position A to position B, it is still in the cell 24, and thus the MCC, MNC, and LAC values will not change. The radiation detection apparatus need not search the database again as the base station combination will not change. If the location change alerts the base station combination, the radiation detection apparatus must request a new set of MCC, MNC, and LAC and repeat all the estimation procedures. As shown in FIG. 2, if the mobile station 22 moves to location C, it connects to a different base station (B4), so the LAC value will also be different.

Figure 4:
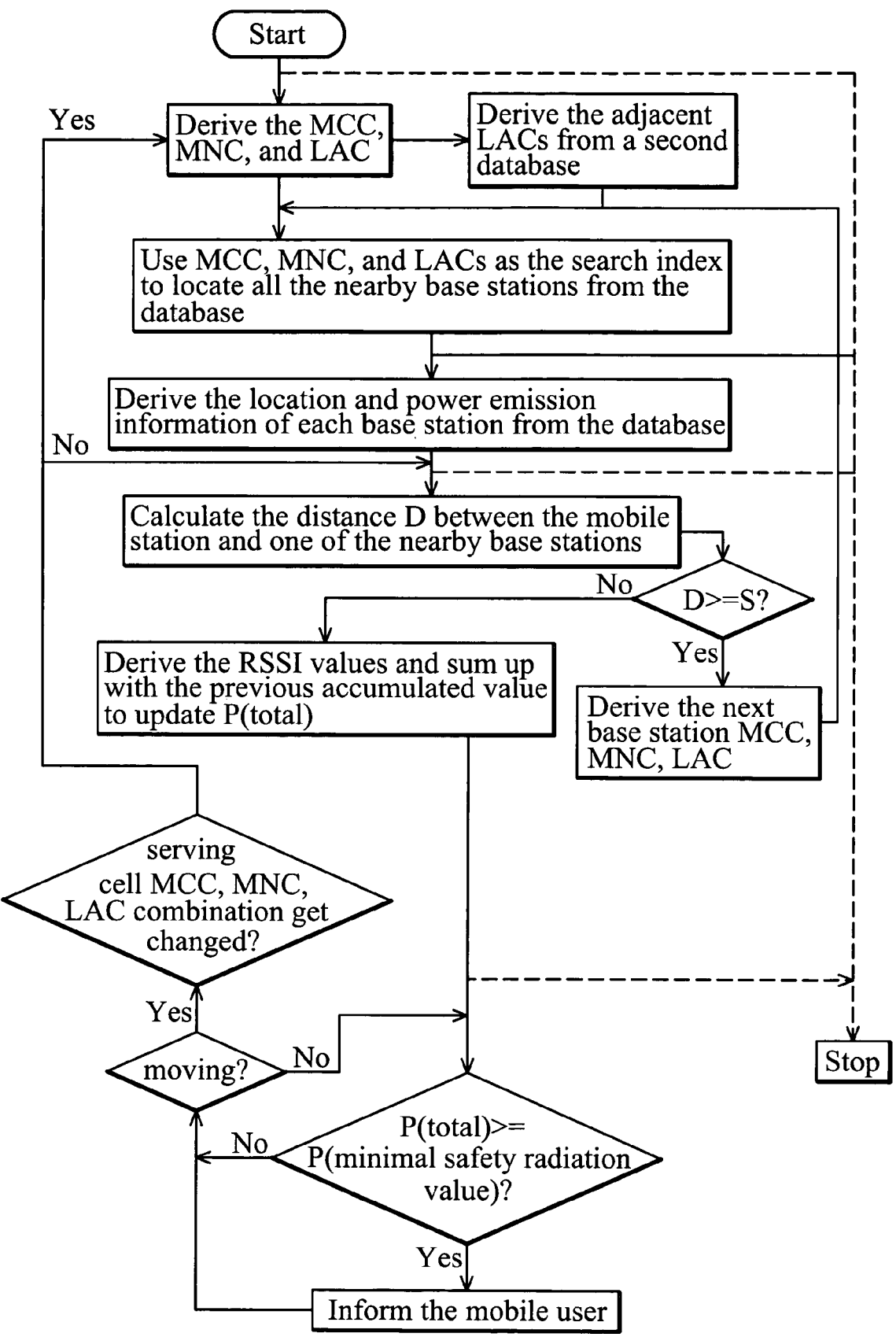
FIG. 4 is a flowchart illustrating the radiation power estimation method according to the second embodiment of the present invention.

FIG. 4 is a flowchart illustrating the radiation power detection and estimation method according to the second embodiment of the present invention. The second embodiment considers the scenario in which the mobile station is located in an area covered by several LACs (cells). If the mobile station is located in an area covered by several LACs, searching for the base station combination with a single LAC value may not be accurate. The LAC derived by the mobile station through broadcast system messages is hence used to derive adjacent LACs. This can be easily determined by another database search through a different table using a given LAC to find other adjacent LACs. In the second embodiment, there are more base stations in the base station combination, but in order to maintain the same effect, only a portion of the base stations are considered in the radiation power estimation. The chosen base stations are the nearest base stations to the mobile station, and base stations that are too far away are assumed to have an insignificant effect on the radiation level. A distance S is predetermined to judge whether the base stations are close enough to the mobile station, if the distance is greater than a threshold S, and the received radiation is considered to be less than the minimum threshold.

Figure 1:
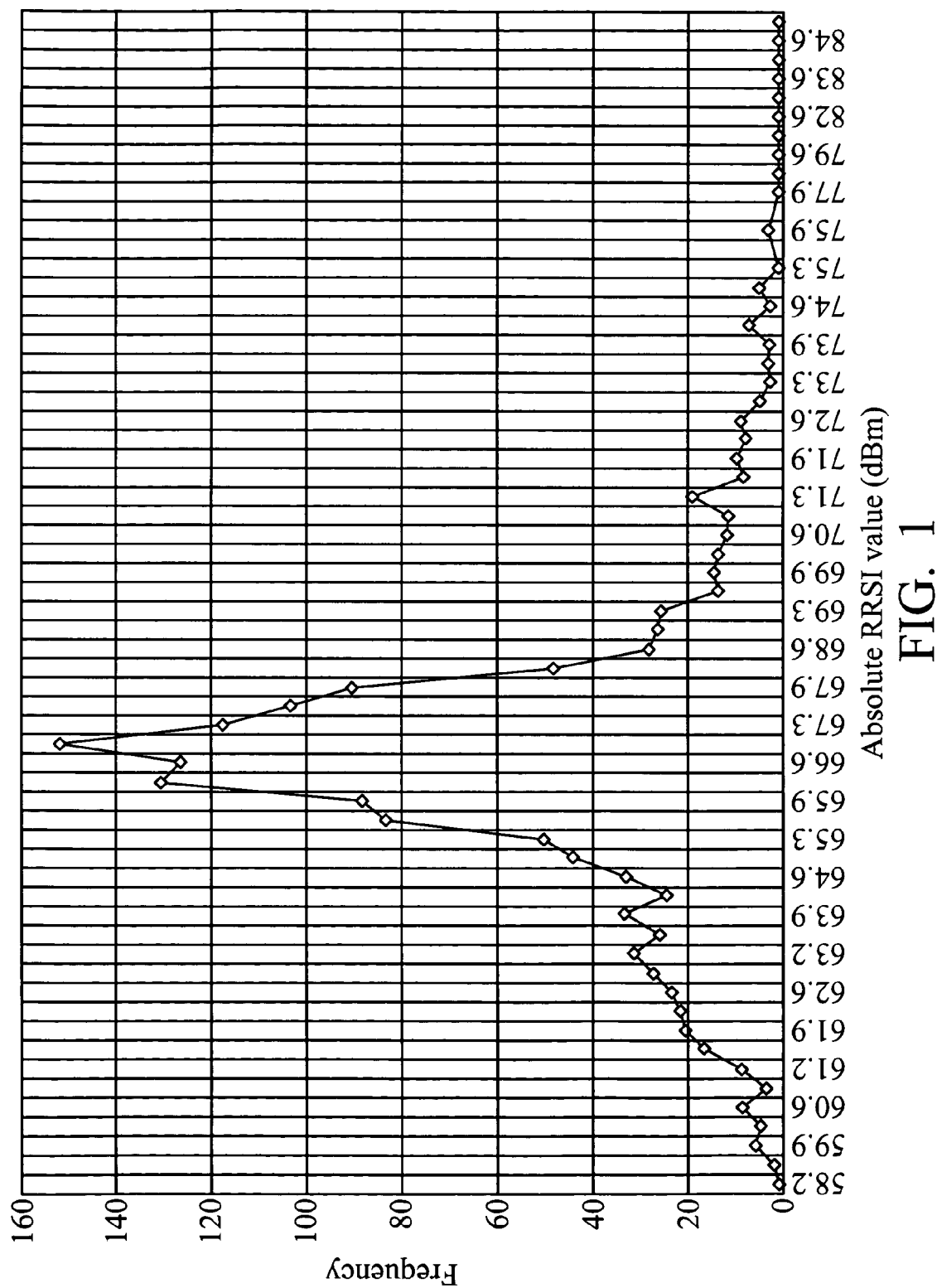
FIG. 1 illustrates the received RSSI data distribution chart targeted at Spirit base station 975.
Figure 5A:
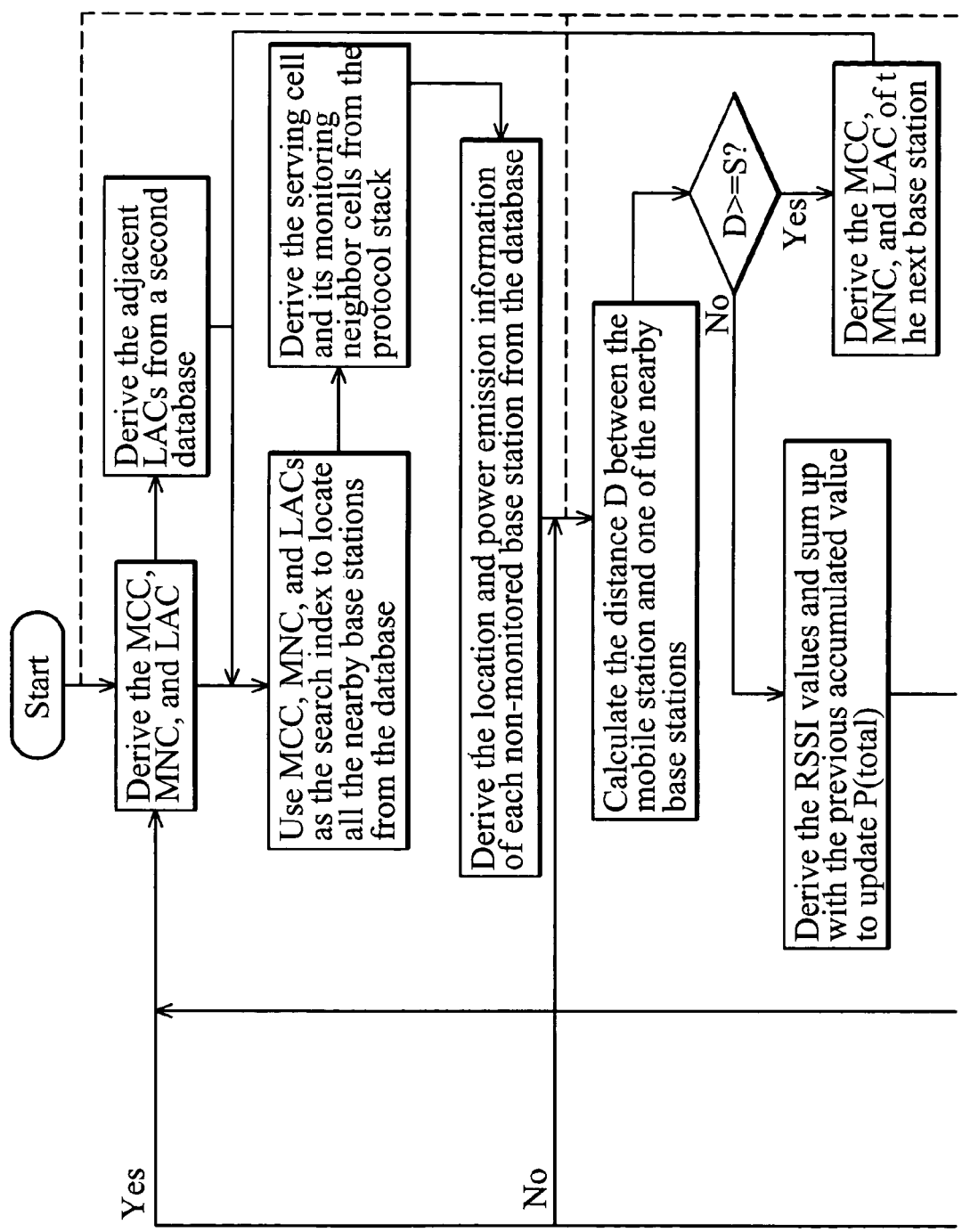
FIGS. 5a and 5b is a flowchart illustrating the radiation power estimation method according to the third embodiment of the present invention.
Figure 5B:
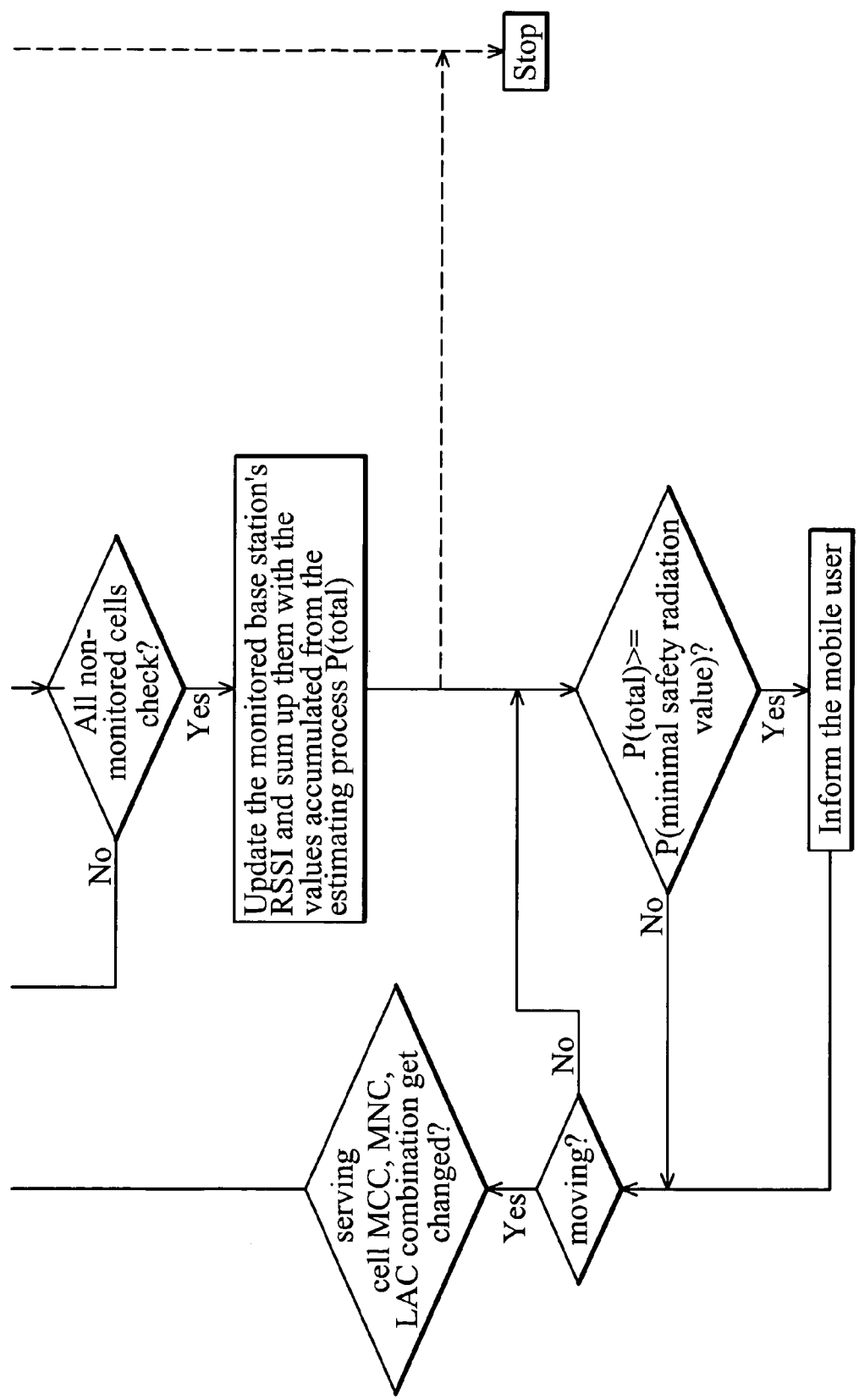

FIG. 5 is a flowchart illustrating the third embodiment of the present invention, wherein interference effects are taken into the estimation process. The protocol stack inside the mobile device constantly measures the received RSSI value of the serving cell and neighbor cells for cell selection and reselection. The measured RSSI value varies greatly from the value derived by the previously described RSSI-distance equation. As shown in FIG. 1, some of the RSSI values may be much larger than the average value. In order to incorporate the interference effect into the radiation detection method of the present invention, the base station monitored by the RF hardware will use the received RSSI value rather than the projected value. Note that the base station combination for radiation power estimation must update to exclude the monitored base stations, as the radiation power emitted from these base stations are now measured rather than calculated.

There are many different causes of interference and thus surrounding radiation levels vary. Some types of interference appear only briefly, while others last longer, or are even permanent. Accordingly, the present invention also provides a method for adjusting the sensitivity of the radiation power detection method by utilizing a rotational counter to record consecutive occurrences "N" of total radiation power greater than the preset minimal safety value, informing the mobile user only if the number of occurrences is greater or equal to a tolerance index. The tolerance index, T (T=<N) is set by the user, if at least T times of radiation signals are detected, the radiation detection apparatus triggers an alert, otherwise no alert is issued.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for a mobile station to detect and estimate radiation power received thereby, comprising the following steps:
    obtaining a current mobile station location;
    generating a base station combination and corresponding base station information, wherein the base station combination and the corresponding base station information are retrieved by searching in a first database while using location information of a serving base station as a search index, the base station combination comprising the serving base station and nearby base stations close to the serving base station;
    calculating a distance between the mobile station and each base station listed in the base station combination according to the current mobile station location and the base station information in the base station combination;
    estimating total radiation power by substituting calculated distances into a predetermined equation;
    checking whether the total radiation power is greater than a preset minimal safety value; and
    informing the mobile user if the total radiation power is greater than the preset value.

2. The radiation detection and estimation method according to claim 1, wherein the base station combination and the corresponding base station information are retrieved from the first database built in the serving base station and sent to the mobile station.

3. The radiation detection and estimation method according to claim 2, wherein the first database of the serving base station is accessed through a wireless packet data protocol.

4. The radiation detection and estimation method according to claim 1, wherein the step of generating a base station combination and corresponding base station information comprises the following steps:
    acquiring the location information from the serving base station; and
    obtaining the base station combination from the first database while using the location information of the serving base station as the search index, wherein the first database is downloaded into a secondary memory device.

5. The radiation detection and estimation method according to claim 1, further comprising preparing the first database offline before the first database is activated.

6. The radiation detection and estimation method according to claim 1, wherein the location information is part of broadcasted cell information for location registration, which is acquired by the mobile station through broadcasting system messages.

7. The radiation detection and estimation method according to claim 1, wherein the location information comprises a Mobile Country Code (MCC), a Mobile Network Code (MNC), and a Location Area Code (LAC) of the serving base station.

8. The radiation detection and estimation method according to claim 7, further comprising:
    deriving adjacent LACs using the LAC of the location information when the mobile station is located in an area covered by several LACs; and
    updating the location information to include the LAC and all the adjacent LACs, to update the base station combination.

9. The radiation detection and estimation method according to claim 8, wherein the adjacent LACs are derived by searching a second database.

10. The radiation detection and estimation method according to claim 1, wherein the first database stores a set of base station information for each base station, and the base station information for a corresponding base station comprises a Mobile Country Code (MCC), a Mobile Network Code (MNC), a Location Area Code (LAC), a base station identification number, power level, longitude, latitude, and altitude of the corresponding base station.

11. The radiation detection and estimation method according to claim 1, wherein the current mobile station location is derived using a location service feature embedded in the mobile station.

12. The radiation detection and estimation method according to claim 11, wherein the location service feature is provided by Assisted Global Positioning System (AGPS).

13. The radiation detection and estimation method according to claim 1, wherein the predetermined equation is derived by summing received radiation power emitted from each base station in the base station combination, and the radiation power emitted from a base station is inversely proportional to the square of the distance between the base station and the mobile station.

14. The radiation detection and estimation method according to claim 1, further comprising:
    deriving a new mobile station location for updating the current location when the change in location does not trigger the change of base station combination; and
    updating the total radiation power according to the new mobile station location.

15. The radiation detection and estimation method according to claim 1, further comprising:
    comparing each of the calculated distances between the mobile station and the base station in the base station combination with a predetermined distance; and
    excluding a far base station from the base station combination if the calculated distance of the far base station is greater than the predetermined distance, thereby simplifying the radiation power estimation calculation.

16. The radiation detection and estimation method according to claim 1, further comprising:

obtaining a list of monitored base stations including the serving base station;

measuring and calculating radiation power of the monitored base stations using a protocol stack inside the mobile station;

excluding the monitored base stations from the base station combination obtained by searching the first database; and combining measured radiation power with estimated radiation power obtained from the predetermined equation as the total radiation power.

17. The radiation detection and estimation method according to claim 1, further comprising:

counting a consecutive number of times the total radiation power is greater than the preset value; and informing the mobile user only if the number of times is greater or equal to a tolerance index.

18. The radiation detection and estimation method according to claim 17, wherein the tolerance index is set by the mobile user.

* * * * *